United States Patent [19]
Normark

[11] 3,985,379
[45] Oct. 12, 1976

[54] FRICTION JOINT BETWEEN MECHANICAL ELEMENTS

[76] Inventor: Olov Magnus Normark, Astrakangatan 2, 162 32 Vallingby, Sweden

[22] Filed: Feb. 2, 1973

[21] Appl. No.: 329,179

[30] Foreign Application Priority Data
Feb. 4, 1972 Sweden.............................. 1350/72

[52] U.S. Cl................................ 285/340; 285/348; 285/255; 285/382; 285/DIG. 3
[51] Int. Cl.² ......................................... F16L 19/08
[58] Field of Search .......... 285/340, 248, 249, 255, 285/DIG. 3, 348, 382, 382.7

[56] References Cited
UNITED STATES PATENTS

| | | | |
|---|---|---|---|
| 859,733 | 7/1907 | Bot ................................... | 285/340 X |
| 2,951,715 | 9/1960 | Bauer................................. | 285/249 |
| 2,986,409 | 5/1961 | Weber................................ | 285/348 X |
| 3,186,743 | 6/1965 | Russell.............................. | 285/348 X |
| 3,365,219 | 1/1968 | Nicolaus............................ | 285/340 |
| 3,545,794 | 12/1970 | Wise.................................. | 285/340 X |
| 3,697,102 | 10/1972 | Falke................................. | 285/340 |

FOREIGN PATENTS OR APPLICATIONS
459,492 9/1949 Canada.............................. 285/340

*Primary Examiner*—Alfred R. Guest
*Attorney, Agent, or Firm*—Eric Y. Munson

[57] ABSTRACT

A friction joint between mechanical elements, of which at least one has a mainly cylindrical surface, including a sleeve-means extending coaxially with the aforementioned cylindrical surface and which is per se capable of being adjusted axially along the cylindrical surface to selected axial relative positions in relation thereto, wherewith arranged substantially coaxially with the sleeve is a frusto-conical spring ring at least one peripheral surface of which abuts a peripheral surface on the sleeve-means and, under substantial reaction against said peripheral surface of said sleeve-means, is capable of being twisted or tilted by means of an axially adjustable ring pressing member acting against the spring ring.

22 Claims, 22 Drawing Figures

Fig_1

Fig_2

Fig_13

Fig_12

Fig_17

Fig_16

FRICTION JOINT BETWEEN MECHANICAL ELEMENTS

BACKGROUND OF THE INVENTION

The present invention relates to a friction joint for connecting mechanical elements, of which at least one has a cylindrical surface.

When connecting together mechanical elements, either in the form of intermediate members arranged, for example, in load carrying or supporting devices, such as frame structures, scaffolding, machines and the like, or forming part of conduit systems for liquid or gaseous media intended to produce sealing, pipe-coupling joints, it has long been the practise to utilize different types of thread joints.

This method, however, renders it necessary to maintain a considerable wall thickness of the tubular elements to be joined, so that the threads do not encroach on the portion of the element material, the dimensions of which must be held continuous so as not to impair the mechanical strength etc. of the elements. With the exception of the relatively short section in which the threads are disposed, this normally implies a waste of relatively expensive material, which has resulted in considerable inventive activity to find ways and means of departing from the principle of thread joints while reducing the wall thickness of the mechanical elements substantially to the dimensions and safety tolerances stipulated with respect to mechanical strength.

In accordance with one proposal, smooth joint surfaces are used, prepared gaps between the surfaces being filled with solder applied in strong, sealing joints with respective surfaces on the joint surfaces.

Although this method has many advantages, the necessity of using additional apparatus such as jointing-metal melting apparatus, and ancillary equipment to enable joints to be made, especially in relatively unaccessible positions, is a disadvantage. Further, this method renders it difficult to make subsequent adjustments to the relative positions of two elements joined together by such a joint, since such adjustments require the joint to be melted down and remade in the adjusted position by re-melting the jointing metal.

In accordance with another, alternative method, a joint is produced between mechanical elements having relatively smooth jointing surfaces with the use of friction creating devices, by means of clamping means. Such devices are often effective for the intended purpose, but in many instances the pressure over the abutting friction surfaces is uneven or is exerted on these surfaces in an unsuitable manner, which may result in a joint of such unreliability as to exclude its use at critical positions. Further, it is often impossible to obtain sufficiently high forces with such joints, whereby normal pressures acting between the friction surfaces is insufficient to maintain the necessary, locking friction forces. Another disadvantage encountered with known clamping devices is that the surfaces of the elements forming part thereof become deformed with repeated use, whereby grooves, scores, burrs etc. are formed on the surfaces and are liable to lock the elements permanently together and prevent convenient subsequent adjustment or dismantling of the elements.

With another alternative, which may be seen as a special embodiment of the aforementioned friction joint, it has been particularly proposed with respect to conduit systems that a strong friction joint is established on one side and on the other side an additional and effective seal is provided against the outflow of media from the conduit system at different conduit coupling joints therein.

In accordance with this alternative, there is used a frustoconical spring ring which is subjected to axial forces while using a cylindrical surface of one element to be joined as an anvil or reaction surface, the axial forces twisting or tilting the spring ring with considerable moments of force. As a result hereof, the relatively, narrow abutment surface of the spring ring will be pressed against the aforementioned cylindrical surface with forces of such magnitude as to cause an extremely strong friction joint between the elements and, at the same time, an extremely effective seal against pressurized media conveyed through the conduit system.

Such a joint presents many advantages, not least because of its simplicity, but, especially with respect to tubular elements, the exceptionally high surface pressure between the normally narrow spring ring abutment surface and the cylindrical surface may cause this latter surface to be deformed in a deleterious manner, e.g. in the case of tubular elements may cause distortion and reforming of the material of said elements, which may be particularly inconvenient or even critical in many instances.

SUMMARY OF THE INVENTION

The object of the present invention is to provide, while utilizing the last mentioned principle, a friction joint which permits greater latitude with respect to said surface pressure and which practically eliminates all risk of deformation of cylindrical jointing surfaces of the elements to be jointed by the joint. In accordance herewith, the invention is mainly characterized by a sleeve-means extending coaxially with the aforementioned cylindrical surface and which is per se capable of being adjusted axially along the cylindrical surface to selected axial relative positions in relation thereto, wherewith arranged substantially coaxially with the sleeve is a frusto-conical spring ring at least one peripheral surface of which abuts a peripheral surface on the sleeve-means and, under substantial reaction against said peripheral surface of said sleeve means, is capable of being twisted or tilted by means of an axially adjustable pressure member acting against the spring ring.

The invention will now be described in more detail with reference to a number of embodiments thereof illustrated diagrammatically in the accompanying drawing, further features of the invention being disclosed in connection therewith.

Figure 1:
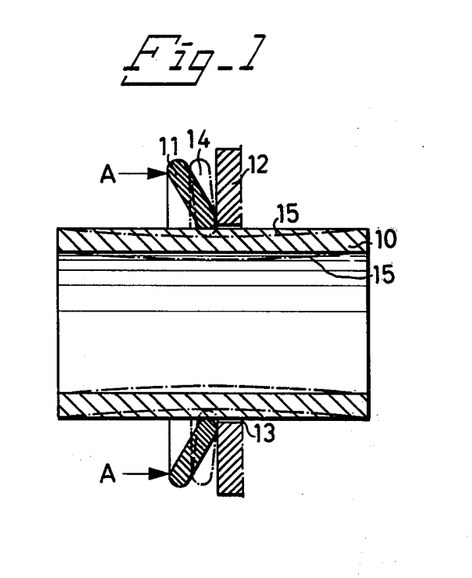
FIG. 1 is a fundamental detail view in axial section of the most important elements of the joint according to the invention and their function when making a friction joint according to the invention.

In FIG. 1 the reference numeral 10 indicates a cylindrical sleeve-means according to the invention, over which means there is placed a frusto-conical spring ring 11 provided with rounded or champered edge surfaces. In accordance with the concept of the invention, however, these edge surfaces may be planar or may present an edge forming section. The material from which the spring ring is made is preferably steel, although other metals and metal alloys, laminates etc. and plastic or fibre material are also conceivable for the intended purpose. The material from which the sleeve-means 10 is formed may be selected from metals, plastics, fibre or other synthetic materials suitable for the purpose intended.

The degree of hardness and the spring characteristics or anticorrosion properties of the materials from which the sleeve-means 10 and the spring ring 11 are made is left to the discretion of the man skilled in the art. Further, the man skilled in the art is fully free to choose dimensions and tolerances applicable to the task in hand.

The reference numeral 12 indicates a solid reaction support member for the spring ring 11, the support member in the illustrated embodiment being shown in the form of an element having a hole 13 which receives the sleeve-means 10 in a manner to leave a certain amount of play. The arrows A are intended to indicate axial forces applied to the outer periphery of the spring ring. Further, the reference numeral 14 indicates the setting of the spring ring in the locked position of the joint, this setting being shown in broken lines. The broken lines 15 illustrate in an exaggerated fashion the inwardly spring position of the sleeve-means 10, this position corresponding to the position of the spring ring 11 shown by the lines 14.

When the sleeve means 10 and the spring ring 11 are viewed with the elements thereof occupying the starting positions shown by the full lines, the sleeve-means has a specific inner and outer diameter along the length thereof. The spring ring 11, which in this position is loosely inserted on the sleeve, suitably has an effective inner diameter which permits free axial movement of the ring 11 along the sleeve. It is thus desirable to maintain the tolerances of both the sleeve 10 and the spring ring 11 so that these elements are in close contact with each other, i.e. so that the clearance therebetween is substantially negligible. As illustrated in the Figure, the spring ring 11 has been passed into abutment with the stationary member 12, which is mainly intended to prevent continued relative movement of the spring ring and the sleeve and to thus form a stop means.

If forces acting in the direction of the arrows A are not applied over the outer peripheral portions of the spring ring 11, which can be effected, for example, by means of the end surface of an adjustable and lockable pressure sleeve or the like (not shown), the spring ring 11 is made to tilt to the position shown by the chain lines 14 while pressing against the sleeve 10 substantially through a toggle lever action, whereby the effective inner diameter of the spring ring 11 is progressively decreased by the twisting movement of the ring. This causes the sleeve-means to be subjected to radial cause which force the same to bend inwardly towards the longitudinal centre axis thereof around the periphery, to the position shown by lines 15.

If, while utilizing the aforedescribed effect, it is desired to produce a purely mechanical friction joint, or both a mechanical friction joint and a joint which seals against medium outer pressure, a rod-like or tubular element can be inserted into at least one open end of the sleeve-means and caused to bear against the spring ring 11 to tilt or twist the same, in order to obtain the joint in the manner described. The considerable radial pressures created in this way will be distributed via the wall of the sleeve-means over the mechanical elements inserted in the sleeve-means, so that a positive sealing friction joint is obtained, at the same time as the wall of the sleeve-means prevents the spring ring from biting into the elements and deforming the ouer surfaces thereof, which would otherwise render removal of the elements difficult or impossible. In this respect the resiliency of the sleeve material or the degree of softness thereof is utilized. The properties required of the material from which the sleeve-means is produced can be decided by experimental tests for each application of the friction joint in question.

Figure 2:
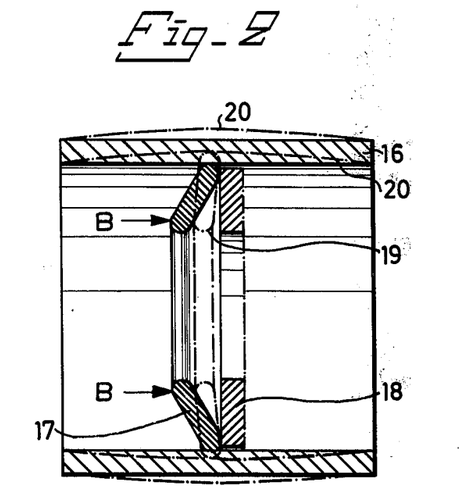
FIG. 2 is a fundamental detail view in axial section of the most important jointing elements according to the invention and their function when making an alternative friction joint according to the invention.

In FIG. 2 the reference numeral 16 indicates a cylindrical sleeve-means according to the invention, within which sleeve a frustoconical spring ring 17 provided with rounded or chamfered edge surfaces is inserted. The essential requirements concerning shape, material, hardness, anti-corrosive properties and spring properties of the sleeve-means 16 and the spring 17 are the same as those disclosed with reference to the embodiment of FIG. 2.

In FIG. 2, the reference numeral 18 indicates a solid reaction support for the spring ring 11, this support being shown in the form of an annular shoulder or the like arranged on a stationary member (not shown) on which the sleeve 16 is placed with a slight play. The arrows B indicate axial forces applied on and around the inner periphery of the spring ring 17. The position adopted by the spring ring in the locked position of the joint is shown by broken lines 19. The broken lines 20 illustrate in an exaggerated fashion the outwardly sprung position of the sleeve-means 16, this position corresponding to the position of the spring ring 17 shown by the broken lines 19.

When the sleeve-means 16 and the spring ring 17 are viewed with the elements thereof in the positions shown by full lines, the sleeve-means has a specific inner and outer diameter along its length. The spring ring 17, which in this position is loosely inserted in the sleeve-means 16, suitably presents an effective outer diameter which permits the spring-ring 17 to freely move axially within the sleeve-means 16. In this connection it is often desirable to maintain the tolerances of both the sleeve 16 and the spring ring 17 such that these elements are in close contact with each other, i.e. so that there is substantially no clearance therebetween. It should be observed that the spring ring 17 is moved into abutment with the stationary member 18, this latter preventing continued relative movement of the spring ring 17 and the sleeve 16, and consequently forms a stop member.

If forces are now applied in the direction of arrows B over the inner peripheral portions of the spring ring 17, which can be effected for example by the end surface of an adjustable and lockable pressure sleeve or the like now shown, the spring ring 17 is forced to erect or tilt against reaction forces from the sleeve 16 until it assumes the position shown by the broken lines 19, whereby the effective outer diameter of the spring ring 17 increases as a result of the erecting movement of the ring. As a result hereof the sleeve is subjected to radially, outwardly directed forces which force the same to bend outwardly from the centre around the periphery to the somewhat exaggerated position shown by the broken lines 20.

If it is desired while utilizing the aforedescribed effect to produce a purely mechanical friction joint or both a mechanical friction joint and a joint which simultaneously seals against medium under pressure, a tubular element can be pushed into one or both ends of the sleeve means 16 to bend or buckle the spring ring 17 in the aforedescribed manner so as to make the desired joint. The considerable radial forces created in this way will be distributed via the wall of the sleeve-means over the inner surface of the tubular, mechanical element or elements pushed on the sleeve 16, so that a positive sealing friction joint is obtained between the elements while, at the same time the wall of the sleeve-means prevents the spring ring 17 from biting into said elements and deforming the inner surfaces thereof in a manner to render it difficult or impossible to dismantle the elements from the sleeve. The resilient properties of the sleeve material or possibly the degree of softness thereof is utilized in this respect. The required properties of the sleeve material in this respect can be established by experimental tests for each application of the joint in question, or may be decided by the man skilled in the art within the framework of his knowledge.

Figure 3:
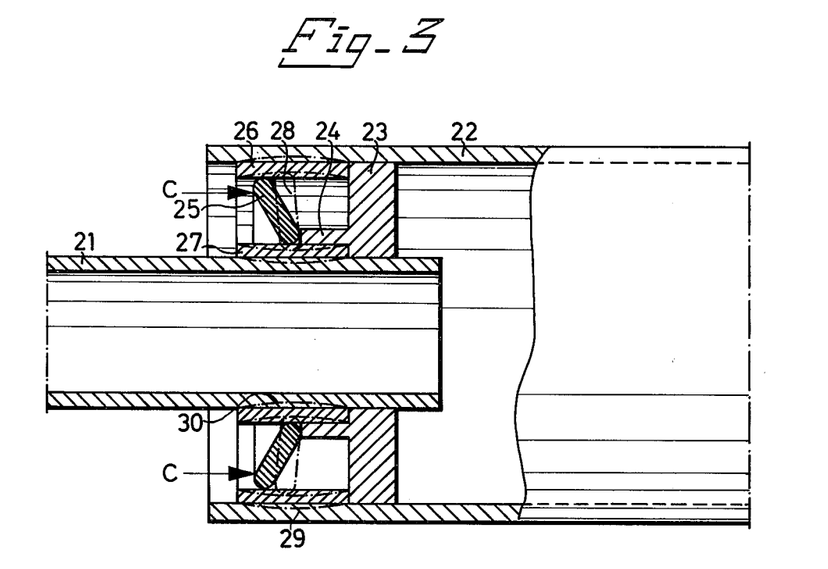
FIG. 3 is a fragmentary axial section showing elements forming part of an embodiment of a sealing friction joint according to the invention between two tubular mechanical elements, the joint being shown in an unlocked and locked position respectively.

FIG. 3 illustrates a somewhat more detailed basic example of a friction joint between two mechanical elements which embodies both of the basic examples described and illustrated in FIGS. 1 and 2.

In the embodiment illustrated in FIG. 3, the mechanical elements to be joined together by means of a friction joint according to the invention comprise a pipe 21 of small diameter and a pipe 22 of slightly larger diameter. In the pipe 22 there is inserted a support ring 23 through which the pipe 21 extends. The support ring 23 is presumed to be stationary either in relation to the pipe 22 or to the pipe 21, and is provided with an axial annular flange 24 intended to serve as a stop member for a frusto-conical spring ring 25. Arranged in the larger pipe 22 in abutment with the stationary member 23 is a sleeve-means 26 of the same type as the sleeve-means 16 illustrated in FIG. 2, while a sleeve-means 27 of substantially the same type as the sleeve-means 10 in FIG. 1 is placed around the pipe 2. This inner peripheral surface of the spring ring 25 abuts the sleeve-means 27 and the outer peripheral surface of said ring abuts the sleeve-means 26. By applying forces C around the outer peripheral surface of the spring ring 25 by means of a press member (not shown) the spring ring 25 can be forced to tilt or erect to the position shown by the dotted lines 28 in the Figure. In this way, the radial dimensions of the spring ring can be changed, thereby subjecting both sleeve-means 26 and 27 to considerable radial cause which force the two sleeve-means 26, 27 into intimate contact with the pipe 22 and the pipe 21 respectively, as shown in exaggerated scale by the broken lines 29 and 30, which lines illustrate in an exaggerated fashion the mode of function of the sleeve-means 26 and 27 when establishing friction contact between respective sleeve-means and the pipes 21 and 22.

The illustrated sleeve-means 26 and 27 are assumed to be completely free in relation to the support means 23, the sleeve-means 27 extending with a suitable fit inwardly of the annular stop flange 24.

The example of the friction joint illustrated in FIG. 3 forms both a mechanical friction joint as well as a joint sealing against pressure media.

Figure 4:
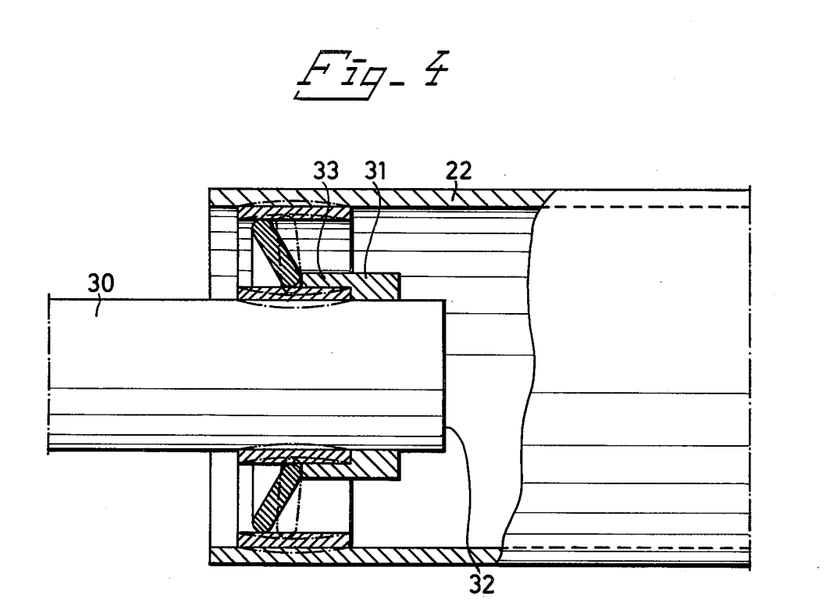
FIG. 4 shows an embodiment similar to the joint illustrated in FIG. 3, one mechanical element being replaced by a solid rod.

FIG. 4 illustrates precisely the same friction joint between two mechanical elements, the pipe 21 in FIG. 3 being replaced by a bolt, rod or the like 30, while the pipe 22 of the embodiment shown in FIG. 3 is retained. The embodiment illustrated in FIG. 4 is merely shown to illustrate a friction joint according to the invention designed as a purely mechanical coupling joint between, for example, the rod 30 and the pipe 22. In this example, there is shown a stationary support member 31 which is presumed to be attached to the inner end 32 of the bolt 30, the support member 31 also being provided with a circular support flange 33 serving as a stop surface.

Figure 5:
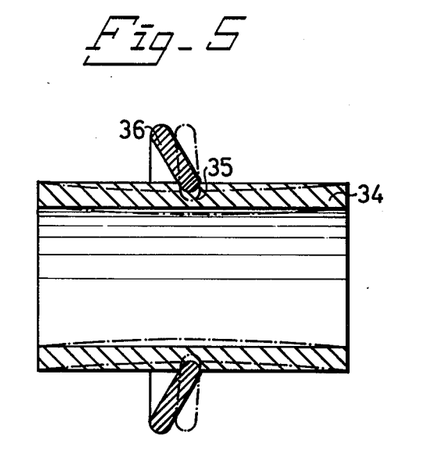
FIG. 5 illustrates a sleeve-means constructed in accordance with the invention as shown in FIG. 1 provided with a stop member for a spring ring co-acting with the sleeve-means.
Figure 6:
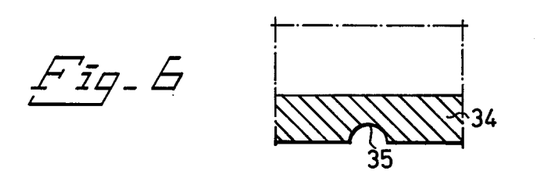
FIG. 6 is an enlarged fragmentary view of the embodiment illustrated in FIG. 5.

As will be seen from the embodiment illustrated in FIGS. 3 and 4, certain problems may arise in fixing the support members which are intended to form means for restricting axial movement of the spring rng on the sleeve-means when pressure forces are applied axially to the spring ring. An example of a simple solution to this problem is shown in FIGS. 5 and 6, the reference numeral 34 indicating a sleeve-means provided approximately in the centre thereof with an external groove 35, the configuration of which can best be seen from FIG. 6. The groove 35 is intended to receive the inner peripheral surface of the spring ring, which in this case contemplates that the spring ring 36 must be sprung slightly inwardly to engage in the groove 35, the wall of which therewith serves as a means for stopping axial movement of the spring ring.

Figure 7:
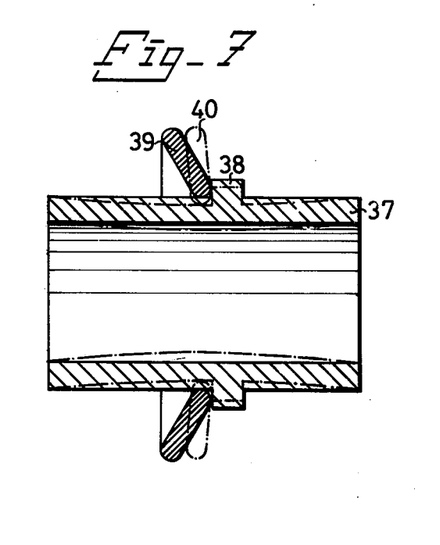
FIG. 7 is an axial section of a sleeve-means constructed in accordance with the invention and provided with an alternative stop member.

FIG. 7 illustrates another simple alternative for solving the aforementioned problem. In this Figure, the reference numeral 37 aforementioned problem. In this Figure, the reference numeral 37 indicates a sleeve-means which is provided externally with an annular flange or the like 38 against which a spring ring 39 abuts and is prevented from continued movement to the right along the sleeve-means 37 during the tilting movement of the spring ring 39 to the position shown by chain lines 40 upon application of axial forces to the ring, as described in connection with the above embodiments.

Figure 8:
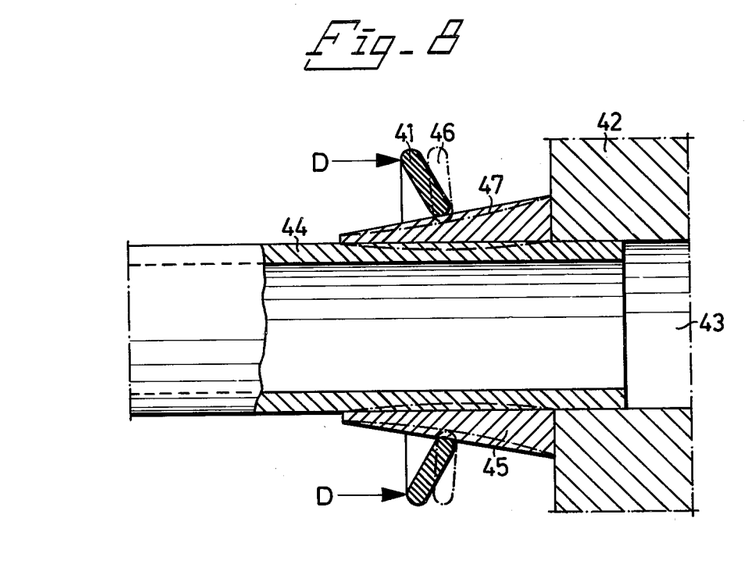
FIG. 8 is an axial section of a modification showing a conical sleeve-means and the manner in which it co-acts with a spring ring according to the invention.

In FIG. 8 there is illustrated a further example of a solution to the aforementioned problems of stopping axial movement of the spring ring, which ring in the illustrated embodiment is indicated by the reference numeral 41. In this example, one mechanical element 42, which may comprise for example a cylindrical wall, container wall or the like, is provided with an insertion opening 43 for the second element 44, which in this case comprises a pipe. Inserted on the pipe 44 is a sleeve-means 45 having a conical outer cylindrical surface. If the spring ring 41 is moved axially to the left in the Figure it will be stopped against continued axial movement by the increasing diameter of the conical surface. As will be evident from the drawing, the ring will adopt a natural stop position on the sleeve-means 45, whereafter the ring 41 can be tilted or erected to the position illustrated by the broken lines 46 by applying axial forces in the direction of arrows D to the outer periphery of the ring. As a result of the forces applied to the ring, the conical sleeve-means 45 is forced to bend slightly inwardly, as shown in an exaggerated fashion by the broken lines 47, and to establish strong frictional contact between the cylindrical inner periphery of the sleeve-means and the opposing outer periphery of the pipe 44. The pressure means required to create the axial forces in the directions of arrow D is presumed in this embodiment to be adjustable, for example in the form of a thread joint arranged at the stationary element 42. Such force applying means are not shown in FIG. 8, however, in order to refrain from unnecessarily complicating the illustration of the concept of the invention in connection with sleeve-means of conical configuration.

Figure 9:
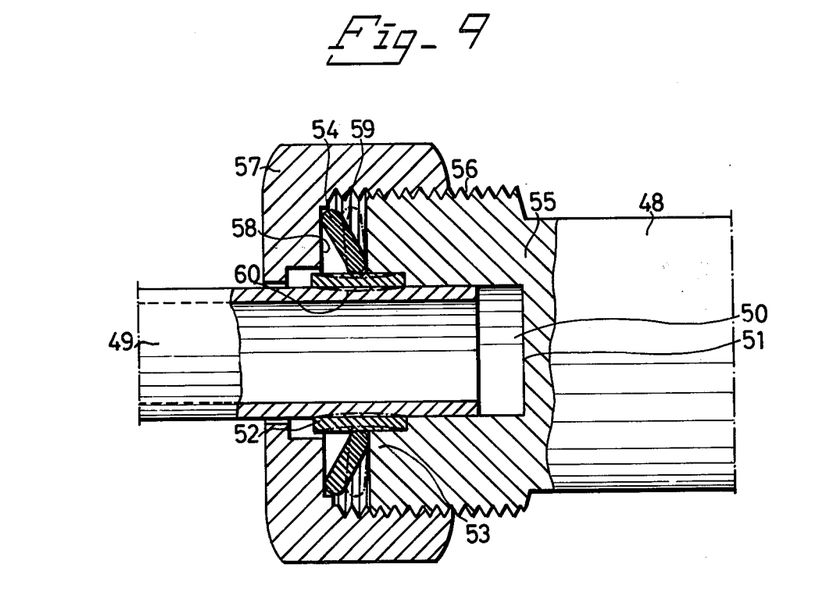
FIG. 9 illustrates an embodiment of a friction joint constructed in accordance with the invention between a sustantially solid mechanical element and a tubular element, while using a cylindrical sleeve-means.

A practical example of a purely mechanical frictional joint between two mechanical elements according to the invention is illustrated partially in axial section in FIG. 9. In this Figure, the reference numeral 48 illustrates a solid rod-like element, while the reference numeral 49 indicates one end of a pipe forming the other of the two mechanical elements to be joined by the friction joint of the present invention. Used in one end of the rod-like member 48 is a cylindrical hole 50 in which the end 49 of the pipe is inserted. The pipe 49 can naturally be inserted to an extent such as to engage the bottom 51 of the hole 50, although it lies within the purview of the invention to insert the pipe to any desired position along the axial length of the hole, since the friction joint of the present invention is a continuous joint which is not reliant on predetermined fixture points.

The embodiment illustrated in FIG. 9 also includes a cylindrical sleeve-means 52 fitted onto the end of the pipe 49 with a slide fit. With this embodiment, the sleeve-means 52 is inserted in a recessed portion of the hole 50 in the rod-like element 48, the end 53 on the rod-like element forming means for limiting axial movement of a spring ring 54.

In the embodiment illustrated in FIG. 9, the end portion 55 of the element 48 is provided with threads 56 located on a portion having a slightly larger diameter than the main diameter of the element 48. Screwed onto the threads 56 is a threaded cap 57 which serves as a ring pressing member and which slides freely on the pipe 49. The cap 57 is internally provided with a pressure surface 58 against which the outer periphery of the spring ring 54 abuts. All the positions of the elements shown in FIG. 9 with full lines represent an initial position adopted before the friction joint is established. The broken lines 59 illustrate the spring ring 54 in its tilted or erected position, to which position the ring is moved by pressure exerted by the pressure surface 58 against the ring 54 as the cap 57 is tightened, i.e. screwed to the left in the drawing. By virtue of the lever or toggle arm action produced through the action of the pressure surface 58 against the spring ring 54, the sleeve-means 52 is pressed forcibly against the outer periphery of the pipe 49, so that the sleeve-means is bent inward, as shown by the broken lines 60. The sleeve-means 52 thus distributes the lever forces around the spring ring in such a manner that a suitable distribution of the forces is obtained between the outer periphery of the pipe 49 and the inner periphery of the sleeve-means 52, which contributes toward establishing a relatively uniform distribution of forces, thereby rendering the friction joint more positive and counteracting damaging deformation of the outer portions of the pipe 49. Furthermore when desired the joint can be dismantled by unscrewing the cap 57 and removing the pipe 49 from the sleeve-means 52.

Figure 10:
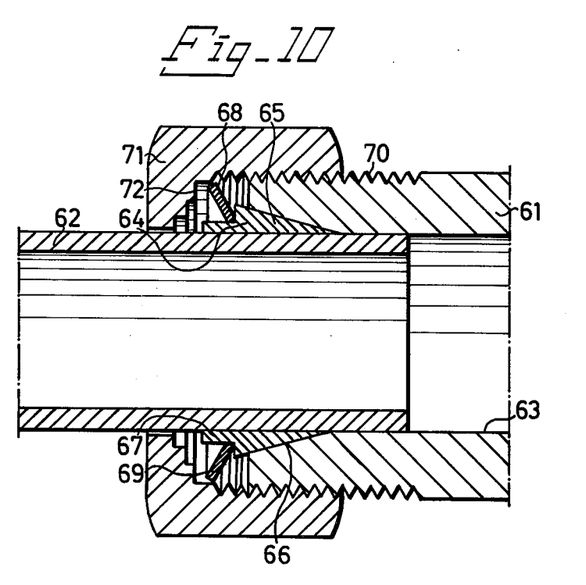
FIGS. 10 and 11 illustrate an example of a sealing friction joint between two tubular mechanical elements in an unlocked and locked position respectively, while using a sleeve-means comprising a conical and a cylindrical portion.
Figure 11:
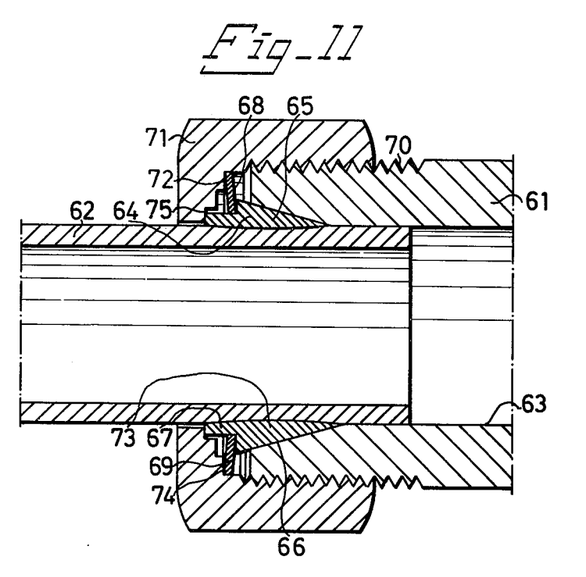

FIGS. 10 and 11 illustrate a more practical design of the friction joint according to the invention, especially suited for simultaneously sealing against media under pressure in preliminary stage for establishing the joint and in a position where the joint is locked. In FIGS. 10 and 11 one of the mechanical elements, which comprises a relatively thick-walled pipe, is indicated by the reference numeral 61, while the other element, which comprises a relatively thin-walled pipe of smaller diameter than pipe 61 is identified by the reference numeral 62. The tube 62 is presumed to fit relatively tightly to the inner periphery 63 of the pipe 61, with a sliding fit. Fitted to the outer periphery of the pipe 62 is a sleeve-means 64 of somewhat modified design in comparison with the aforedescribed sleeve-means. The sleeve-means 64 of this embodiment comprises a conical portion 65. The outer periphery 66 of which fits against a corresponding conical annular surface in the mouth of the pipe 61, and an annular flange 67, which in the illustrated example is also of conical configuration. Between the conical surface 66 and the annular flange 67 is an annular shoulder 60 intended to serve as a stop member for the spring ring 69.

As will be seen from the Figure, the pipe 61 is provided with a threaded end portion 70 on which is screwed a cap-forming pressing means 71 provided with an inner press surface 72 against which the spring ring 69 loosely abuts in the position illustrated in FIG. 1, which represents the position in which the joint between the two elements 61 and 62 has not yet been established.

FIG. 11 illustrates a position of the element shown in FIG. 10 which represents a positon in which the friction joint is established. As will be seen from the Figure, the spring ring 69 in this position has been tilted or erected by screwing up the pressing means 71. As indicated by the lead line 73, as a result of the lever effect from the spring ring 69, the sleeve-means 64 is bent inwardly into intimate contact with the wall of the pipe 62. In this way there is established a sealing frictional joint between the inner periphery of the sleeve-means 64 and the outer periphery of the pipe 62. As will also be seen from FIG. 11, an intimate sealing contact is also established between the outer periphery of the annular flange 67 and the inner periphery of the spring ring 69. Furthermore, the conical surface 66 on the sleeve-means 64 has also been brought into intimate, sealing contact with a corresponding conical surface in the mouth of the pipe 61 by axial activation of the press thus 71, which means establishes a highly effective seal between the pipe 61 and the pipe 62. In addition hereto there is also obtained a seal between the outer periphery of the spring ring 69 and an abutment surface 74 in the interior of the pressing means 71, which seal provides additional strength to the friction joint to insure it against leakage of medium under pressure from the pipe 61 and 62.

It should also be observed that the pressing means 71 is provided at its inner periphery with an annular radial surface 75 which at the same time as the pressing means causes the spring ring 69 to tilt or become distorted also effectuates pressing of the sleeve-means 64 against the conical surface in the mouth of pipe 61, and hence the press means 71 has the double purpose of moving the sleeve-means 64 to a stop position and, at the same time, to tilt or distort the spring ring to an operative position.

Figure 12:
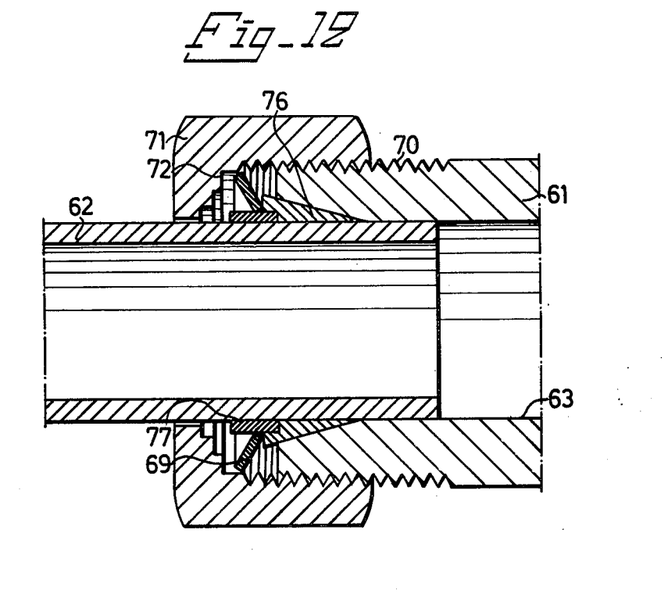
FIGS. 12 and 13 illustrate a modified embodiment of the joint shown in FIGS. 10 and 11, the conical and the cylindrical portion comprising elements capable of being separated from each other.
Figure 13:
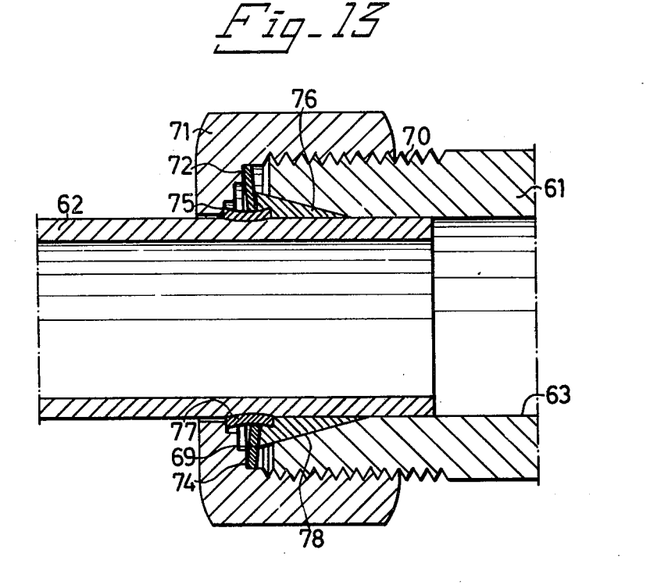

The embodiment illustrated in FIGS. 12 and 13 is essentially the same as that illustrated in FIGS. 10 and 11, the elements of the embodiment of FIGS. 12 and 13 being identified with the same reference numerals as those used in FIGS. 10 and 11. The difference between the embodiment of FIGS. 12 and 13 and that of FIGS. 10 and 11 resides in a modification of the sleeve-means 64, which is constructed as an integrated unit.

While the sleeve-means 64 in FIGS. 10 and 11 comprises the two portions 65 and 67 combined to form an integral unit, these components in the embodiment of FIGS. 12 and 13 comprise separate parts, namely a conical part 76, which projects freely into a cylindrical sleeve 77. In other respects the arrangement of FIGS. 12 and 13 operates essentially in the same manner as that illustrated in FIGS. 10 and 11. The cylindrical sleeve 77 forms the actual sleeve means, which alone - as will be evident from FIG. 13 — is subjected to forces from the spring ring 69, which forces cause the sleeve to bend inwardly against the pipe 62, while the conical element 76 is substantially completely relieved from these forces and consequently the conical surface 78 of the sleeve is able to seal better against the corresponding conical surface in the mouth of the pipe 61, and hence the surface 68 is unable to bend when the spring ring 69 is erected or tilted, but is only pressed into tighter sealing friction contact with the pipe 61 and the outer periphery of the pipe 62 by the axial forces from the press means 71. This joint is thought to present certain sealing advantages in comparison with the embodiment illustrated in FIGS. 10 and 11.

Figure 14:
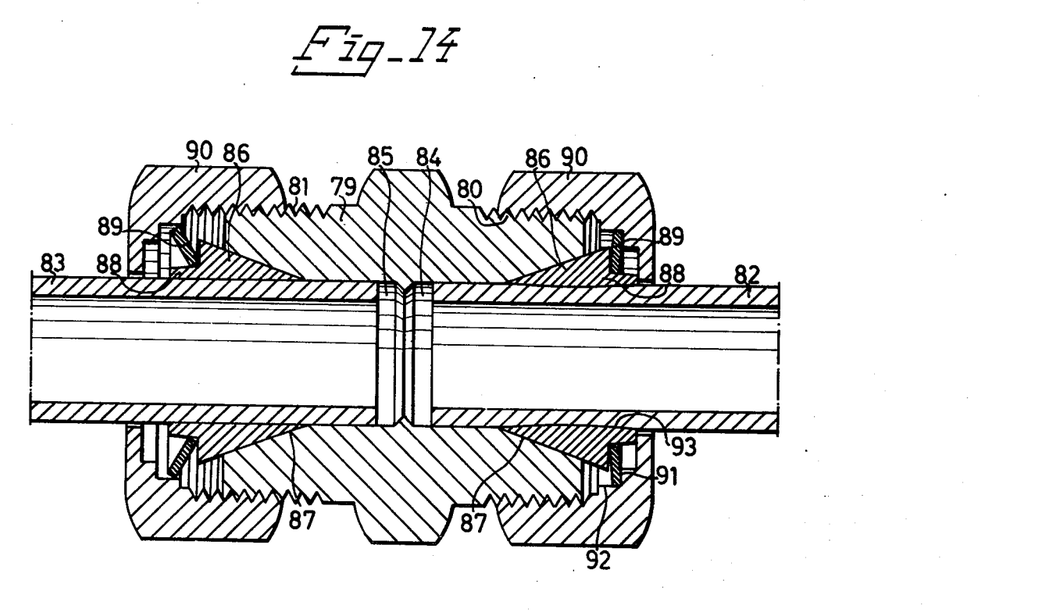
FIG. 14 illustrates an embodiment of a coupling muff for two tubular mechanical elements provided with coupling means according to the invention, there being used a sleeve-means having two elements which are tapered downwardly in opposite directions, the joint on the left side of the Figure being shown in an unlocked position and on the right side of the Figure in a locked position.

FIG. 14 illustrates the invention when applied to a coupling muff for simultaneously connecting together two tubular mechanical elements by means of a mechanical friction joint according to the invention, which joint simultaneously serves as a seal against leakage of medium under pressure from the elements being joined. With this embodiment, the reference numeral 79 indicates a muff having threads 80 and 81 and in which two pipes 82 and 83 are inserted into abutment with each other at their ends 84 and 85 respectively. On each pipe 82 and 83 there is fitted a sleeve-means comprising a conical sealing portion 86 which fits in a conical mouth 87 in respective ends of the muff 79, and a conical member 88 which tapers in the opposite direction to conical member 86 and which has fitted thereto a spring ring 89 of the same type as that described in relation to the other embodiments of the invention. On each threaded end of the muff there is also screwed a cap-like pressing means 90. The pressing means 90 on the right side of the embodiment as seen in FIG. 14 has been tightened so that the spring ring 89 is moved inwardly against the muff 79 on the conical portion 88 of the sleeve-means to a stop position thereon and is tilted or distorted by action of the press surface 91 within the pressing means 90. It should be observed that the outer periphery of the spring ring 89, subsequent to tilting or distorting the ring, is brought into contact with an annular surface 92 located inside the pressing means 90. In this way the spring ring 89 seals while being in effective frictional contact both at the inner and outer peripheral portion, simultaneously as it causes the sleeve-means 86, 88 to bend inwardly towards the centre as the ring is tilted or distorted, this action being illustrated in an exaggerated fashion by the line 93, causing a sealing frictional contact between the pipe 82 and the muff 79.

On the left of FIG. 14 there is shown the other cap-shaped pressing means 90 in a preparatory position from which it can be tightened on the muff to cause the spring ring 89 to be tilted or distorted.

Figure 15:
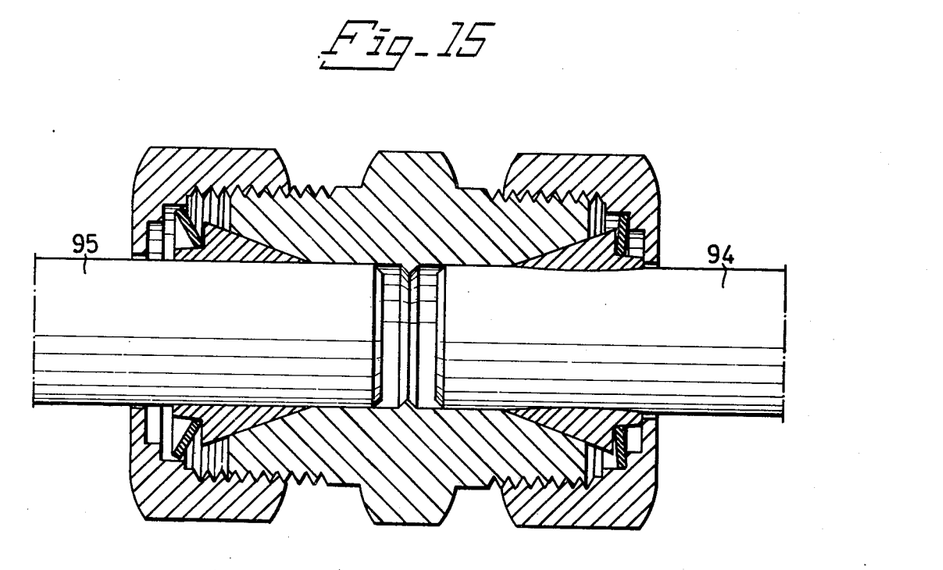
FIG. 15 illustrates the same embodiment as that shown in FIG. 14, with the exception that the tubular mechanical elements have been replaced with rods.

FIG. 15 illustrates the same arrangement as that shown in FIG. 14, but with the difference that the mechanical elements to be joined together have the form of two rods 94 and 95.

It lies within the purview of the invention, however, to substitute one of the illustrated pipes with a solid rod.

Figure 16:
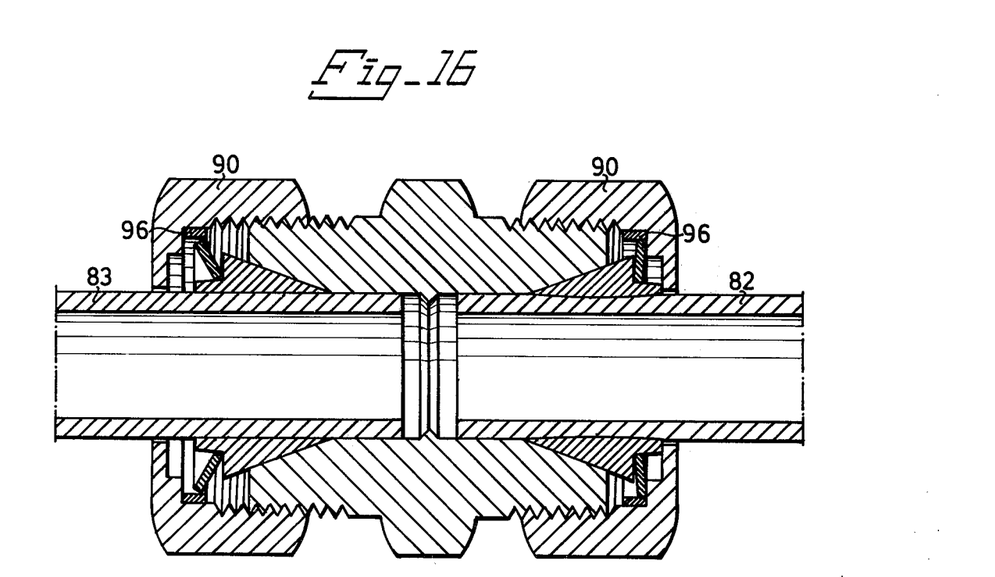
FIGS. 16 and 17 illustrate embodiments similar to those illustrated in FIGS. 14 and 15 respectively, with the exception that slide rings have been inserted between respective spring rings and associating press members.
Figure 17:
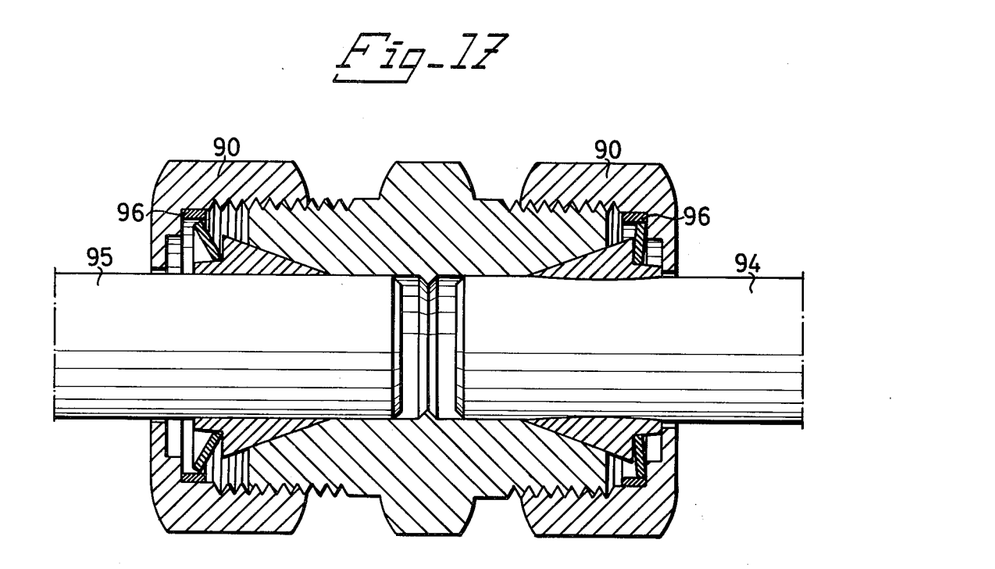

FIGS. 16 and 17 illustrates the arrangement shown in FIGS. 14 and 15, with the single modification that the slide rings or the like 96 against which the spring rings are pressed when being tilted or distorted are loosely inserted in the cap-shaped press members 90.

Figure 18:
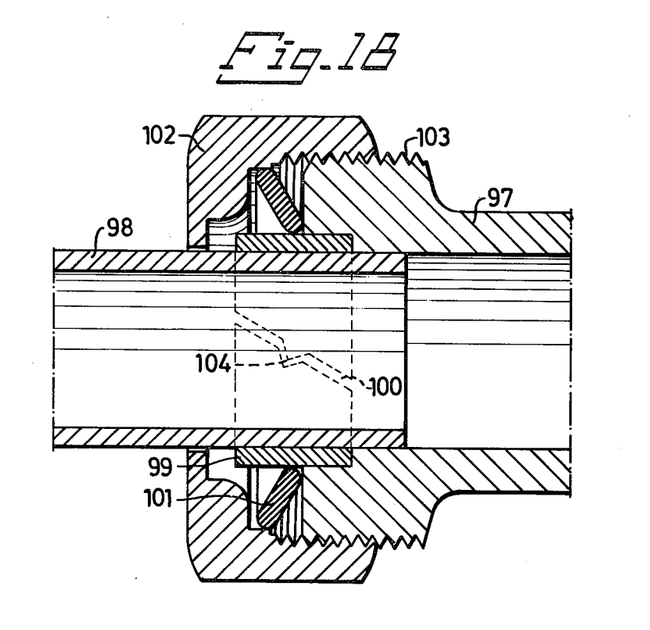
FIG. 18 illustrates a modified embodiment of a slotted, cylindrical sleeve-means.

FIG. 18 illustrates a modified joint according to the present invention between a tubular member 97 and a pipe 98. In this alternative embodiment, the sleeve-means 99 has the form of a resilient, cylindrical sleeve provided with a slot 100. The slot 100 is intended to enable the sleeve-means to engage around the pipe 98 more strongly upon certain degrees of peripheral movement there-around, so that the opposing edge surfaces of the slot are brought into sealing abutment with each other when the spring ring 101 is tilted or distorted as the cap 102 is tightened on the threaded end 103 of the tubular member 97. With this embodiment, the slot 100 forms at the centre a step-shaped outwardly bulging portion 104 intended to assist in bringing the slot edges of the sleeve 99 into exact aligned abutment. Other embodiments are conceivable within the purview of the invention for obtaining the desired curvature of the slot. It is desirable, however, that the diametrical dimensions of the sleeve-means 99 in the relaxed position of the member are adjusted with respect to the general dimension of the slot 100 in such a manner that the defining edges of the slot in the locked position of the joint lie tightly and sealingly against each other, to prevent any leakage of medium conveyed through the tubular member 97 and the pipe 98. With purely mechanical joints, the slotted sleeve-means improves the frictional engagement of the joint.

Figure 19:
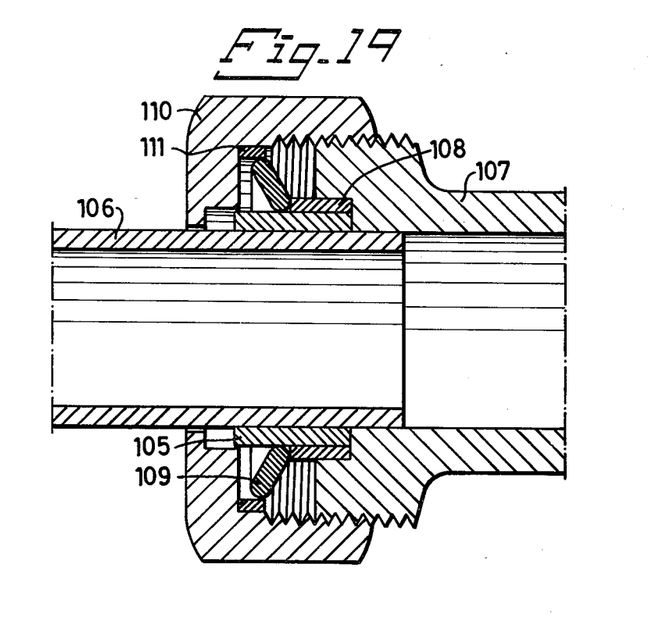
FIG. 19 illustrates a modified embodiment of the joint shown in FIG. 9 with a ring acting as a stop for the spring ring loosely placed on the sleeve-means.

FIG. 19 illustrates a further, modified embodiment of the invention, the reference numeral 105 indicating a loose, cylindrical sleeve encircling a pipe 106, which is inserted in a tubular member 107. On the top of the sleeve 105 is loosely fitted a sleeve 108, which forms a stop for the spring ring 109. In this embodiment, a loose slide or slot ring 111 is also arranged in the press cap 110, the spring ring when tilted or distorted being brought into abutment with the ring 111 at the same time as the ring is pressed against the sleeve 105.

Figure 20:
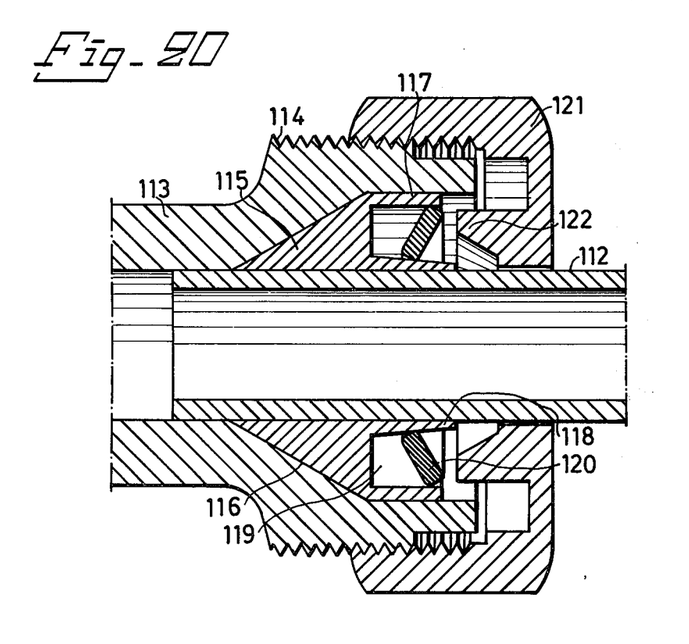
FIGS. 20 and 21 illustrate in unlocked and locked position respectively a special joint constructed in accordance with the invention, the sleeve-means comprising a conical portion and an inner and outer annular flange for co-acting at the same time with a conical spring ring according to the invention.
Figure 21:
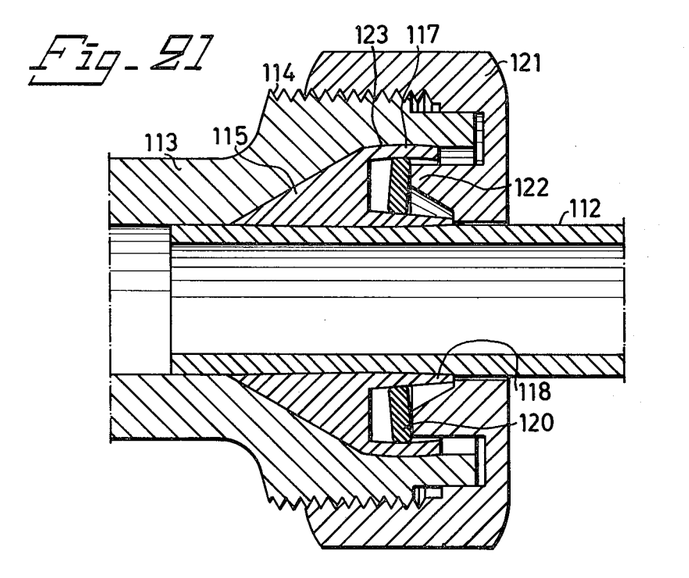

FIGS. 20 and 21 illustrate an embodiment of a sealing friction joint according to the invention in an unlocked and locked position respectively, this embodiment being more complicated than the embodiments of the joint according to the invention described in the aforegoing.

In FIGS. 20 and 21 the reference numeral 112 indicates one mechanical element in the form of a pipe, and the reference numeral 113 indicates the other mechanical element in the form of a tubular member, e.g. a stub pipe or the like having on one end thereof threads 114. In this embodiment, the sleeve-means has a slightly modified form in comparison with the sleeve-means before described. Thus, the sleeve-means in FIGS. 20 and 21 comprises a conical portion 115 fitting into a corresponding conical recess 116 in the element 113, and a peripheral annular flange 117 and a conical annular flange 118, both of which flanges define an annular groove 119 in which a spring ring 120 is loosely inserted (FIG. 20).

Screwed onto the flange 114 on the mechanical element 113 is a cap-like pressing means 121, which is internally provided with an annular shoulder 112 fitting opposite the groove 119 in the sleeve means in front of the spring ring 20, which still occupies its nonactivated position (FIG. 20).

In FIG. 2 the pressing means 121 has been tightened on the thread 114, the annular shoulder 122 having tilted or distorted the spring ring 20 so that, in comparison with the position illustrated in FIG. 20, the spring has taken a more radial position. Subsequent to tilting or distorting the ring in this manner, the outer annular flange 117 is forced to bow radially outwardly into sealing engagement with the inner surface 123 of the tubular element 113. At the same time the spring ring has been brought to a position on the conical annular flange 118 in which it is forced to bow radially inwardly into strong abutment with the outer periphery of the pipe 112, wherewith portions of the conical portion 115 of the sleeve-means are also forced axially inwardly into sealing frictional contact with the outer periphery of the pipe 112.

As will be seen from the FIGS. 20 and 21, extremely good frictional contact and a good sealing effect is obtained by utilizing the specially constructed sleeve-means of the present invention, the conical portion 15 of the sleeve-means by the wedging action between the pipe 112 and the annular element 113 establishing one type of frictional joint and the annular flanges 117 and 118 another type of frictional joint which supplements the aforementioned frictional joint both with respect to the inner periphery of the element 113 and the outer periphery of the pipe 112. This arrangement provides an extremely effective and reliable frictional joint.

It also lies within the purview of the invention to alternatively make the outer annular flange 117 of conical configuration or to make both the annular flanges 117 and 118 conical.

The constructional alternatives discussed and illustrated with respect to FIGS. 20 and 21 lie fully within the purview of the invention. These alternative designs, however, permit a special modification which formally differs from the invention as defined above but the functional properties of which technically substantially lie within the framework of the main inventive concept.

One such modification involves replacing the tiltable and distortable spring ring with a substantially rigid ring of which one or both peripheral surfaces have tapering contact surfaces with annular flanges.

Different edge profiles on the spring ring according to the invention have been discussed above with reference to FIGS. 1 and 2. These profiles, however, will vary according to the preference of the man skilled in the art, particularly at the places of application, where it is of the greatest importance that the special construction of the spring ring answers to the special requirements forced by circumstances.

One of many such cases is reflected in the specially preferred embodiment of the invention in which a sleeve-means having a conical stop surface for the spring ring is used, and where the sleeve-means is simultaneously used for conventional axial sealing purposes, particularly while using conical sealing means. To further illustrate this concept which is inherent in the present invention reference is made to FIG. 22, which shows diagrammatically a sleeve-means having a design particularly adapted for a special purpose.

Figure 22:
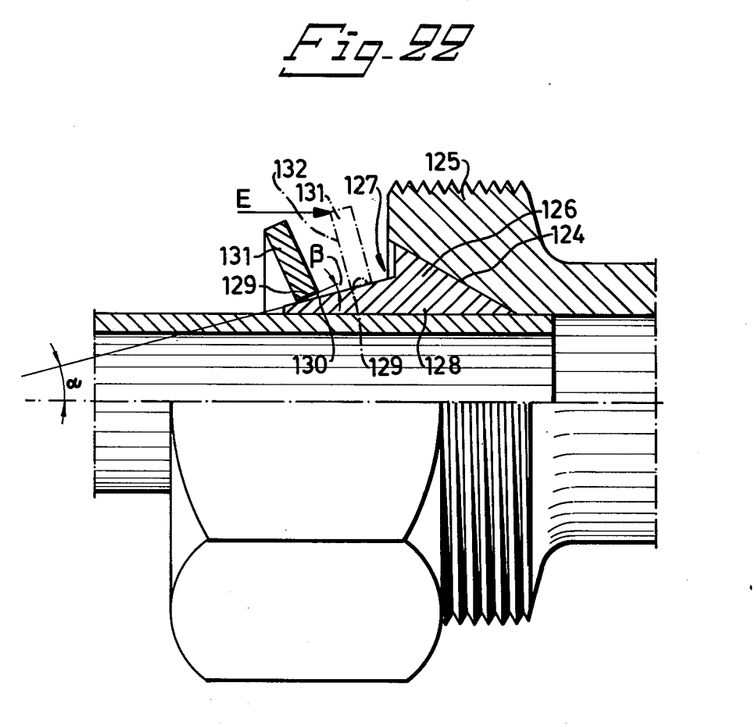
FIG. 22 is a diagrammatic view of an embodiment of a conical sleeve-means and a spring ring according to a modified embodiment of the invention.

Thus, FIG. 22 illustrates a stationary member shown generally at 125 having an internal conical seating surface 124. Abutting the surface of the conical seating is a corresponding conical portion 126 of a sleeve-means 127 constructed according to the invention. The conical portion 126 is designed to be pressed into sealing abutment with the seating surface 124 in a conventional manner, by applying axial forces thereto.

As illustrated in the FIG. 22, the sleeve-means at its opposite end is provided with a further conical portion 128, tapering in the opposite direction to said first mentioned conical portion and provided with a cone angle α, the size of which is selected for the purpose at hand. To the left in the Figure there is illustrated a spring ring 131 according to the invention, which ring is loosely fitted to the conical portion 128. On this connection it should be noted that the spring ring 131 has a substantially planar edge profile, as shown at 129, and that the edge profile forms an angle β with the cylindrical surface 130 of the conical portion 128. It should be understood that the spring ring 131 is located in a first stop position on the conical cylindrical surface 130, i.e. a position before the spring ring 131 is subjected to the necessary axial tilting and distorting forces.

Axial forces acting in the direction of arrows E are applied to the spring ring 131 to lock the joint. As these forces are applied the spring 131 will begin to tilt so that the angle β is reduced during continued movement on the cylindrical surface 130 from the first stop position until the spring ring has reached its definite stop position, as shown by the dotted line 132. In this position the edge surface 129 lies in intimate engagements with the cylindrical surface 130, the spring ring converting the axial forces E into radial forces, which causes the sleeve-means 127 to bend radially inwardly towards the centre and to subject the entire sleeve-means to axial forces which produce the required friction between the conical portion 126 and the seating surface 124. Owing to its construction, this joint has extremely good frictional and sealing properties, the spring ring simultaneously serving as a force transmission means for both types of joint.

Although the edge profiles of the spring ring in the illustrated embodiment are completely planar, it lies within the purview of the invention to disrupt the planar surface of said profiles or to chamfer or round-off the edge corner zones of the profile section for example.

In the illustrated embodiment, the spring ring is of relatively large wall thickness, although this is in no way restrictive of the invention. Although no mention has been made in the aforegoing regarding the surface properties of the sleeve-means in particular, it should be understood that these can be arbitrarily selected. Thus, it is often suitable to ensure that these surfaces of the sleeve means which come into direct contact with the mechanical elements are given a surface structure suitable for the purpose, in order to enhance the frictional engagement therebetween.

Further, different multiple arrangements of spring rings on the same sleeve-means or on combined sleeve-means or on separate sleeve-means which are combined in one way or another also lies within the purview of the invention.

It is also possible to use the friction joint according to the present invention to connect mechanical elements having a number of surfaces, preferably equally spaced circumferentially and with a mainly circular cross-section, e.g. steel wires. In order to improve the tensile strength of the joint in this case, the space between the aforementioned circumferentially spaced surfaces can be filled out with a suitable material, e.g. by welding or other similar methods, in order to achieve a mainly cylindrical surface for contact with the friction joint according to the present invention. However, the friction joint according to the present invention can be used between mechanical elements, of which at least one has a number of circumferentially spaced surfaces and a mainly circular cross-section, without any actions in order to achieve a completely circular surface for the part inserted into the frictional joint.

The invention is not restricted to the illustrated and described embodiments but can be modified within the scope of the following claims.

What I claim is:

1. In a friction joint for interconnecting a plurality of separate elements, at least one of which elements has a generally cylindrical surface, utilizing toggle-like flexible spring locking ring construction, the improvement minimizing deformation of the jointing surfaces of the elements to be joined while permitting greater latitude of surface pressure in a joint capable of providing a friction joint and an effective seal comprising: a sleeve means extending coaxially with said cylindrical surface and being adjustable axially relative thereto, said sleeve means constituting a first part of a locking member for locking the joint in the adjusted position relative to said cylindrical surface; a flexible ring member constituting a second part of said locking member arranged substantially coaxially with said sleeve means and having a substantially frusto-conical configuration when in unflexed position relative to said sleeve means, at least one peripheral surface of said ring member abutting a peripheral surface of said sleeve member, said sleeve means and said ring member being so dimensioned as to force said sleeve means into pressure contact with said cylindrical surface upon flexure of said ring member into a substantially erect position relative to said sleeve means.

2. An improved friction joint according to claim 1, in which the ring member is flexed by pressing means associated with at least one of said separate elements.

3. A friction joint according to claim 2 characterized in that a second of said element is provided with stop surfaces to prevent movement of the sleeve means along the cylindrical surface in the position of the joint, and that the pressing means is provided with axial pressure transmitting means co-acting with the ring member and threads engaging corresponding threads arranged on said second mechanical element for flexing the ring member against the resisting force exerted by the sleeve-means when the pressing means is pressed against the ring member.

4. A friction joint according to claim 3, characterized in that the second element is provided with conical stop surfaces to prevent movement of the sleeve-means along the cylindrical surface, and that a conical member having substantially the same angle of inclination as the said conical stop surface is arranged to co-act with the sleeve-means, the conical cylindrical surface of the conical member being designed to be pressed by the pressing means against the conical stop surfaces of said second element.

5. A friction joint according to claim 4, characterized in that the conical member comprises an integral portion of the sleeve-means.

6. A friction joint according to claim 4, characterized in that the conical member is loose in relation to the sleeve-means but abuts the same in at least the locked position of the joint.

7. A friction joint according to claim 4, characterized in that in addition to pressure surfaces for co-action with the ring member the press member also provides pressure surfaces for co-acting with the sleeve-means for transmitting axial forces to and from the same.

8. A friction joint according to any of claim 2, characterized in that the pressing means is provided with a peripheral surface located opposite the sleeve-means and of such radial dimensions that the main difference in radii between the periphery and the opposing periphery on the sleeve-means against which the ring member abuts at least coincides with the radial dimensions of the spring ring in the flexed position thereof, so that the spring ring with mainly radially directed forces is pressed through its one peripheral surface against the sleeve-means and with its other peripheral surface against the peripheral surface opposite the sleeve member of the press member.

9. An improved friction joint according to claim 1, characterized in that the sleeve-means at least around said one peripheral surface is provided with abutment means forming a stop for the movement of said ring member relative to the sleeve-means when the ring member is in its flexed position.

10. An improved friction joint according to claim 9, characterized in that the sleeve-means is provided with an annular abutment extending externally of the relevant peripheral portion of the sleeve-means.

11. An improved friction joint according to claim 10, characterized in that the shoulder is formed by an extra sleeve loosely co-arranged with the sleeve-means.

12. A friction joint according to claim 1, characterized in that the relevant portion of the peripheral surface of the sleeve-means against which the spring ring abuts has an increasing diameter in the flexing direction of the spring ring.

13. A friction joint according to claim 12, characterized in that the peripheral surface of the ring member abutting the conical peripheral surface of the sleeve-means has substantially the same conicicity as the said peripheral surface of said sleeve-means, and that the edges of the ring member are rounded or chamfered.

14. A friction joint according to claim 12, characterized in that the peripheral surface of the ring member abutting the conical peripheral surface of the sleeve-means has the same conicicity as the said peripheral surface of the sleeve-means.

15. An improved friction joint according to any of claims 1 characterized in that said one element comprises a substantially solid member, and that the other element has a cavity receiving the solid member.

16. A friction joint according to any of claims 1, characterized in that the elements comprise substantially solid rods, of which at least the end portions are cylindrical and placed in substantially axial alignment at any distance part, or in end-to-end abutting relationship, said end portion being encircled by a common coupling muff which together with either one of said rods forms said second element in relation to the other rod.

17. An improved friction joint according to any of claims 1, characterized in that the mechanical elements comprise tubes, hoses or the like of different dimensions, one tube being telescopically received in a second tube while leaving therebetween an annular gap of sufficient size to receive at least said sleeve-means and spring ring.

18. A friction joint according to claims 1, characterized in that the mechanical elements comprise tube, hoses, or the like of the same dimension, at least the end portions of the elements being placed in substantially axial alignment with each other at a selected distance apart or in direct end-to-end abutment, said end portions being encircled by a common coupling mouth which together with either one of said elements forms one of the mechanical elements.

19. A friction joint according to any of claims 1, characterized in that said sleeve-means is slotted and resilient to enable the slot surface to be pressed together by radial forces exerted by the spring ring as it is tilted or distorted.

20. A friction joint according to any of claims 1, characterized in that the sleeve-means has two substantially concentrical annular flanges located at a radial distance apart with respect to each other, between which flanges the ring member is flexibly arranged.

21. A friction joint according to claim 20, characterized in that at least one angular flange has a tapering contact surface arranged to co-act with the ring member.

22. A friction joint according to claim 21, characterized in that the ring member comprises a substantially rigid ring of which at least one peripheral surface which abuts said one annular flange also has a tapering contact surface.

* * * * *